(12) United States Patent
Hosaka (10) Patent No.: US 10,186,165 B2
(45) Date of Patent: Jan. 22, 2019

(54) VIBRATION DEVICE AND VIBRATION SYSTEM FOR SIMULATOR INCLUDING THE SAME

(71) Applicant: Kabushiki Kaisha Saginomiya Seisakusho, Tokyo (JP)

(72) Inventor: Tomohiro Hosaka, Sayama (JP)

(73) Assignee: KABUSHIKI KAISHA SAGINOMIYA SEISAKUSHO, Tokyo (JP)

( * ) Notice: Subject to any disclaimer, the term of this patent is extended or adjusted under 35 U.S.C. 154(b) by 536 days.

(21) Appl. No.: 14/987,364

(22) PCT Filed: Jun. 13, 2014

(86) PCT No.: PCT/JP2014/003165
§ 371 (c)(1),
(2) Date: Jan. 4, 2016

(87) PCT Pub. No.: WO2015/019535
PCT Pub. Date: Feb. 12, 2015

(65) Prior Publication Data
US 2016/0293039 A1    Oct. 6, 2016

(30) Foreign Application Priority Data

Aug. 8, 2013    (JP) .................................. 2013-165462

(51) Int. Cl.
*G09B 9/02* (2006.01)
*G09B 9/14* (2006.01)
(Continued)

(52) U.S. Cl.
CPC ................. *G09B 9/02* (2013.01); *G09B 9/12* (2013.01); *G09B 9/14* (2013.01); *G09B 9/04* (2013.01); *G09B 9/05* (2013.01)

(58) Field of Classification Search
CPC ........................................................ G09B 9/02
(Continued)

(56) References Cited

U.S. PATENT DOCUMENTS 4,485,339 A * 11/1984 Trost ................... G03F 7/70716
269/58
5,078,240 A * 1/1992 Ackermann ............ F16F 9/465
188/282.2

(Continued)

FOREIGN PATENT DOCUMENTS

JP    H05-56374 A    3/1993
JP    H09-071969 A    3/1997
(Continued)

OTHER PUBLICATIONS

Office Action dated Jul. 14, 2017, issued in Korean Application No. 10-2015-7037189.
(Continued)

*Primary Examiner* — John E Simms, Jr.
*Assistant Examiner* — Dolores Collins
(74) *Attorney, Agent, or Firm* — Workman Nydegger (57) ABSTRACT

Each of slide duct devices which are attached to actuators (38A and 38B) constituting each vibration device includes a cableveyor (42A) through which a wire/ductwork material group (WH) is inserted, a guide duct (40A), and a slide rail unit (SLU) slidably supporting the guide duct (40A). A swinging base (12) connected to the actuators (38A and 38B) has a wire/ductwork material alignment mechanism (50) enabling alignment of the wire/ductwork material group (WH) passing through the guide duct (40A) without damaging the same.

5 Claims, 13 Drawing Sheets

(51) Int. Cl.
*G09B 9/12* (2006.01)
*G09B 9/04* (2006.01)
*G09B 9/05* (2006.01)

(58) Field of Classification Search
USPC .......................................................... 434/69
See application file for complete search history.

(56) References Cited

U.S. PATENT DOCUMENTS

| | | | | | |
|---|---|---|---|---|---|
| 5,116,188 | A | * | 5/1992 | Kurohashi | F16F 9/56 414/685 |
| 5,170,103 | A | * | 12/1992 | Rouch | B23B 29/022 318/128 |
| 5,551,540 | A | * | 9/1996 | F orster | F16F 9/466 188/267 |
| 5,706,476 | A | * | 1/1998 | Giramma | G06F 17/5022 703/15 |
| 6,511,035 | B1 | * | 1/2003 | Teel | F16F 15/02 248/550 |
| 7,683,508 | B2 | * | 3/2010 | Delson | H01F 7/1615 310/21 |
| 7,919,945 | B2 | * | 4/2011 | Houston | A63F 13/06 310/14 |
| 9,111,563 | B2 | * | 8/2015 | Lantz | G11B 5/5582 |
| 2008/0019702 | A1 | * | 1/2008 | Shibatani | G02B 6/4225 398/182 |
| 2008/0106223 | A1 | * | 5/2008 | Delson | H01F 7/1615 318/114 |

FOREIGN PATENT DOCUMENTS

| | | |
|---|---|---|
| JP | 2002/311808 A | 10/2002 |
| JP | 2005-505783 A | 2/2005 |
| JP | 2007-033563 A | 2/2007 |
| JP | 2013-094939 A | 5/2013 |
| KR | 20-1997-0010878 | 3/1997 |
| KR | 20-2013-0001001 | 2/2013 |
| KR | 10-2013-0066037 | 6/2013 |
| WO | 2013/114179 A1 | 8/2013 |

OTHER PUBLICATIONS

Opinion (the reply, and Written Reply), filed in Korean Application No. 10-2015-7037189 dated Sep. 14, 2017.
Form IB/338 English translation of International Preliminary Report on Patentability and Written Opinion for PCT/JP2014/003165 dated Feb. 18, 2016.
Kazuho Miki, "Activities of Simulators—Latest Trends of Driving Simulator," Journal of the Institute of Electrical Engineers of Japan, Jul. 20, 1997, vol. 117, No. 8, pp. 516-519.
Office Action dated May 30, 2018, issued in European Application No. 14835006.9.
Anonymous: "*VI-grade—Ferrari adopts revolutionary driving simulation technology from VI-grade and Saginomiya*", Mar. 6, 2013 (Mar. 6, 2013), pp. 1-2, XP055349183, Retrieved from the Internet:URL:http://www.vi-grade.com/index.php?pagid=news_det &nid=97, (retrieved on Feb. 23, 2017), 2 pgs.
VI-grade—Climbing the Peaks of System-Level Simulation: "*Unveiling new motion platform DiM (Driver in Motion)*", Youtube, Apr. 18, 2013 (Apr. 18, 2013), XP054977179, Retrieved from the Internet: URL:https://www.youtube.com/watch?v=f9GtHb5BHhM, (retrieved on Feb. 28, 2017), 7 pgs.
Diego Minen, *Dim—Driver in Motion*, Aug. 30, 2013 (Aug. 30, 2013), pp. 1-6, XP055349165, Retrieved from the Internet: URL:http://www.vi-grade.com/doc_dwn.php?dfd=1035, (retrieved on Feb. 23, 2017), 6 pgs.

\* cited by examiner

FIG.12A though the wire harnesses may be routed with more than sufficient length, such a configuration is inexpedient because whirling of the wire harnesses and the like may occur when the driving simulator is in operation. Moreover, an increase in degree of freedom of the XY translation mechanism as the vibration device makes it is not easy to route and fix the wire harnesses within the driving simulator, for example.
VIBRATION DEVICE AND VIBRATION SYSTEM FOR SIMULATOR INCLUDING THE SAME

TECHNICAL FIELD

The present invention relates to a vibration device and a vibration system for a simulator including the same.

BACKGROUND ART

As shown in Patent Documents 1 and 2, for example, a driving simulator comprises: a dome in which a vehicle model is installed; a hexapod which is provided between a moving stage and a supporting stage for a bed constituting the bottom of the dome and supports the dome; and an XY translation mechanism which translates the dome. The hexapod is a mechanism with six degrees of freedom which allows the dome to tilt in the pitch direction, roll direction, and yaw direction and has six hydraulic cylinders. The XY translation mechanism as a vibration device translates the dome in X and Y directions, which are orthogonal to each other in a common plane, through the hexapod. In such cases, the XY translation mechanism, which has two degrees of freedom, is configured to move the moving stage with two driving motors through rails and belts. The vehicle model in the dome, hexapod, XY translation mechanism, and sensors attached to the hexapod and XY translation mechanism are electrically connected to a predetermined computer through predetermined wire harnesses.

PRIOR ART DOCUMENTS

Patent Documents

PATENT DOCUMENT 1: Japanese Patent Laid-Open No. 2007-33563
PATENT DOCUMENT 2: Japanese Patent Laid-Open No. 2005-505783
PATENT DOCUMENT 3: Japanese Patent Laid-Open No. 2002-311808
PATENT DOCUMENT 4: Japanese Utility Model Laid-Open No. H05-56374 (1993)

SUMMARY OF INVENTION

Technical Problem

In the aforementioned driving simulator, the aforementioned wire harnesses need to be fixed and arranged within the driving simulator so as not to obstruct a field of view of examinee sitting in the vehicle model or not to inhibit the movement of the hexapod, XY translation mechanism, and the like while the driving simulator is in operation.

However, when the wire harnesses are attached to movable portions of the hexapod, XY translation mechanism, and the like and the dome and XY translation mechanism move at comparatively high speed in a comparatively wide range, the harnesses are subjected to some bending or tensile stress and could be broken. In such cases, though the wire harnesses may be routed with more than sufficient length, such a configuration is inexpedient because whirling of the wire harnesses and the like may occur when the driving simulator is in operation. Moreover, an increase in degree of freedom of the XY translation mechanism as the vibration device makes it is not easy to route and fix the wire harnesses within the driving simulator, for example.

In view of the above-described problem, the present invention aims to provide a vibration device and a vibration system for a simulator including the same. The vibration device and a vibration system for a simulator including the same can be easily routed within the simulator with wires and tubes being not subjected to any bending or tensile stress while the simulator is in operation as well as can be easily arranged in accordance with the degrees of freedom of the vibration device.

To achieve the object described above, the vibration device according to the present invention comprises: an actuator having a piston which has a connected fixed end at one end thereof connected to a swinging base configured to reciprocate and swing, and which is moved between a first position and a second position; driving and controlling means for driving and controlling the actuator; a guide duct which has a passage communicating with one open end thereof, through which a wire or duct material is inserted, and is supported by the actuator so as to be movable in accordance with the movement of the piston; and an alignment mechanism which is provided at the connected fixed end at the one end of the piston and is configured to align the wire or duct material extended from another open end of the passage of the guide duct through a slidable and rotatable alignment member.

A vibration system for a simulator including a vibration device according to the present invention comprises: a plurality of actuators respectively having pistons which have connected fixed ends at one ends thereof connected to different places in a swinging base configured to reciprocate and swing, and each of which is moved between a first position and a second position; driving and controlling means for driving and controlling the actuators; a guide duct that has a passage communicating with one open end thereof, through which a wire or duct material is inserted, and is supported by at least one of the plurality of actuators so as to be movable in accordance with the movement of the piston; an alignment mechanism which is provided at the connected fixed end of the one end of the piston and is configured to align the wire or duct material extended from another open end of the passage of the guide duct through a plurality of slidable and rotatable alignment members; and a hexapod which is provided between a cockpit supporting bed and the swinging base and has a mechanism with six degrees of freedom.

The vibration device and the vibration system for a simulator including the same according to the present invention comprise: the guide duct that has a passage communicating with one open end thereof through which the wire or duct material is inserted and that is supported by the actuator so as to be movable in accordance with the movement of the piston; and the alignment mechanism which is provided at the connected fixed end at one end of the piston and aligns the wire or duct material extending from another open end of the passage of the guide duct through the slidable and movable alignment member. Accordingly, the wire or duct material follows movement of the piston, and the position and curve of the wire or duct material are adjusted by the alignment member. Therefore, the wires and ducts are not subjected to any bending or tensile stress while the simulator is in operation and can be easily routed within the simulator. Moreover, the wires and ducts can be easily arranged in accordance with the degrees of freedom of the vibration device.

DESCRIPTION OF EMBODIMENTS

Figure 2:
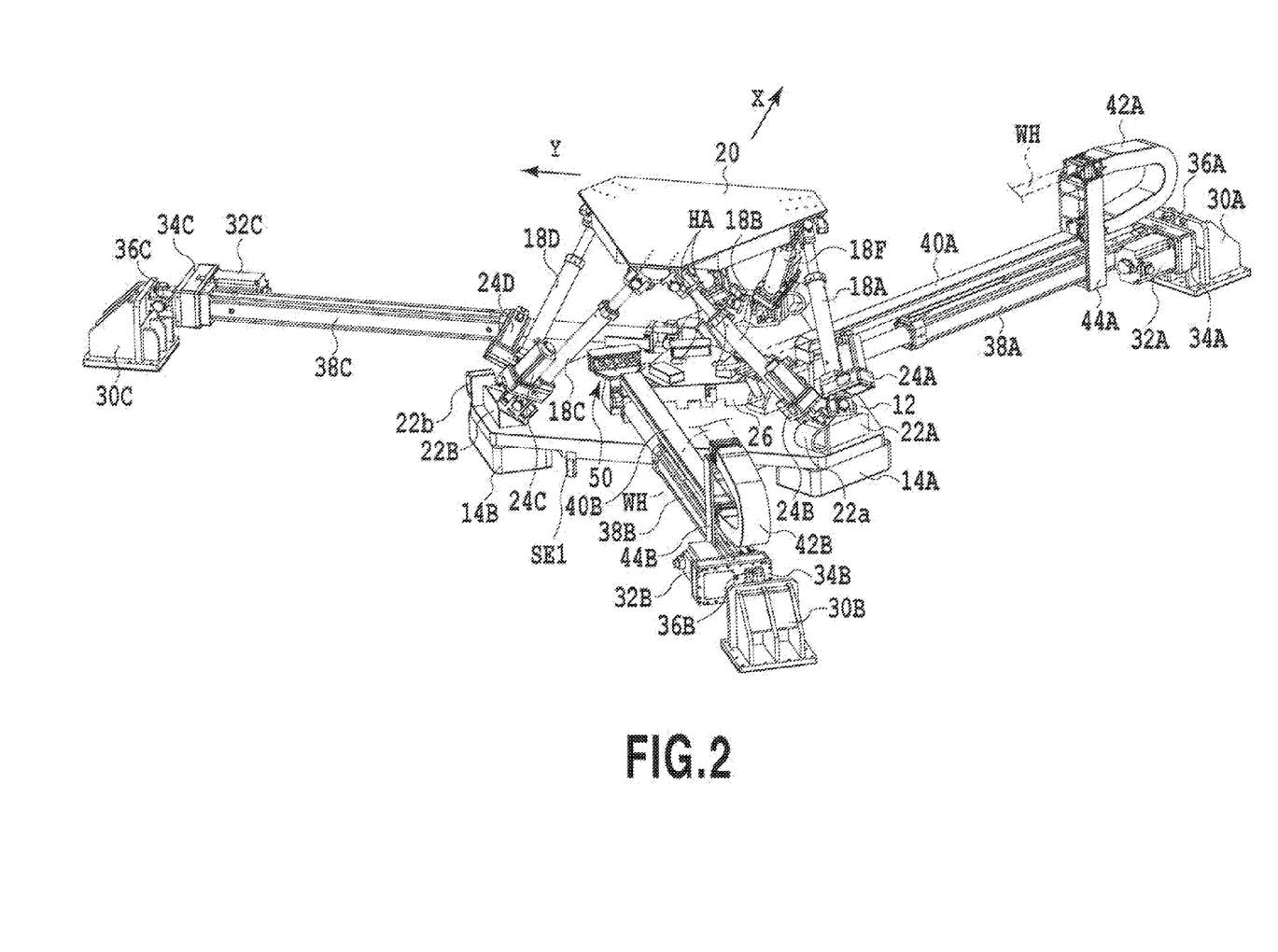
FIG. 2 is a perspective view schematically illustrating the configuration of an example of the vibration system for a simulator including the vibration device according to the present invention.

FIG. 2 schematically illustrates an appearance of an example of a vibration system for a simulator including a vibration device according to the present invention.

In FIG. 2, the vibration system for a simulator is located at a predetermined position in a driving simulator, for example. In FIG. 2, a cockpit CP (see FIGS. 2 and 3) of a not-shown vehicle model is fixed to a cockpit supporting bed 20 at the upper end of a later-described hexapod. The cockpit CP is located on the cockpit supporting bed 20 so that the front end and left door of the vehicle model are directed in directions of arrows X and Y in FIG. 2, respectively.

Figure 5:
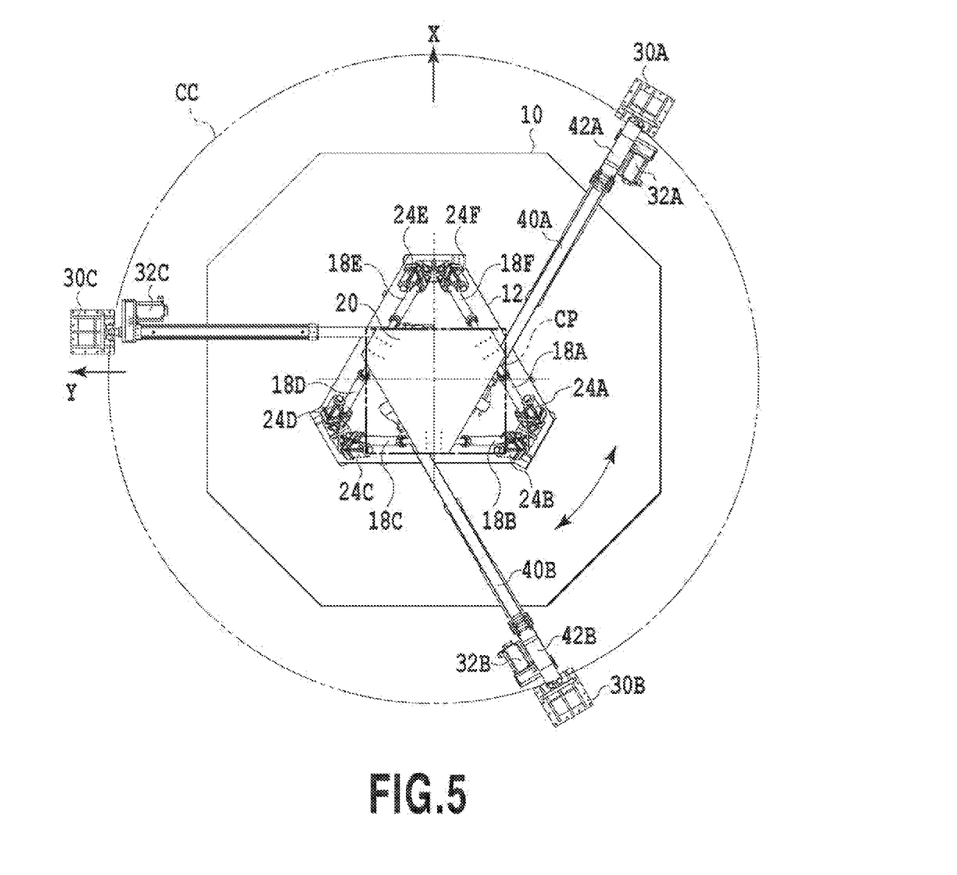
FIG. 5 is a plan view of the example illustrated in FIG. 2.

As illustrated in FIG. 5, the vibration system for a simulator comprises the followings as major components: three vibration devices located in three places equally in circumferentially spaced so as to surround the cockpit CP and configured to reciprocate and swing a later-described swinging base 12; the swinging base 12 provided on the cockpit CP side of the respective vibration devices and connected to one end of each vibration device, a hexapod located between the cockpit supporting bed 20 and the swinging base 12 and configured to control the attitude of the cockpit supporting bed 20; slide duct devices attached to the respective vibration devices; and a host computer (not illustrated).

The swinging base 12, which has three degrees of freedom, is provided so as to reciprocate and swing on a surface plate 10 (see FIG. 5) having a predetermined flatness. Namely, the swinging base 12 is capable to swing in both directions of arrows in FIG. 5 and reciprocate along the axis of a piston of an actuator of each vibration device described later.

Figure 3:
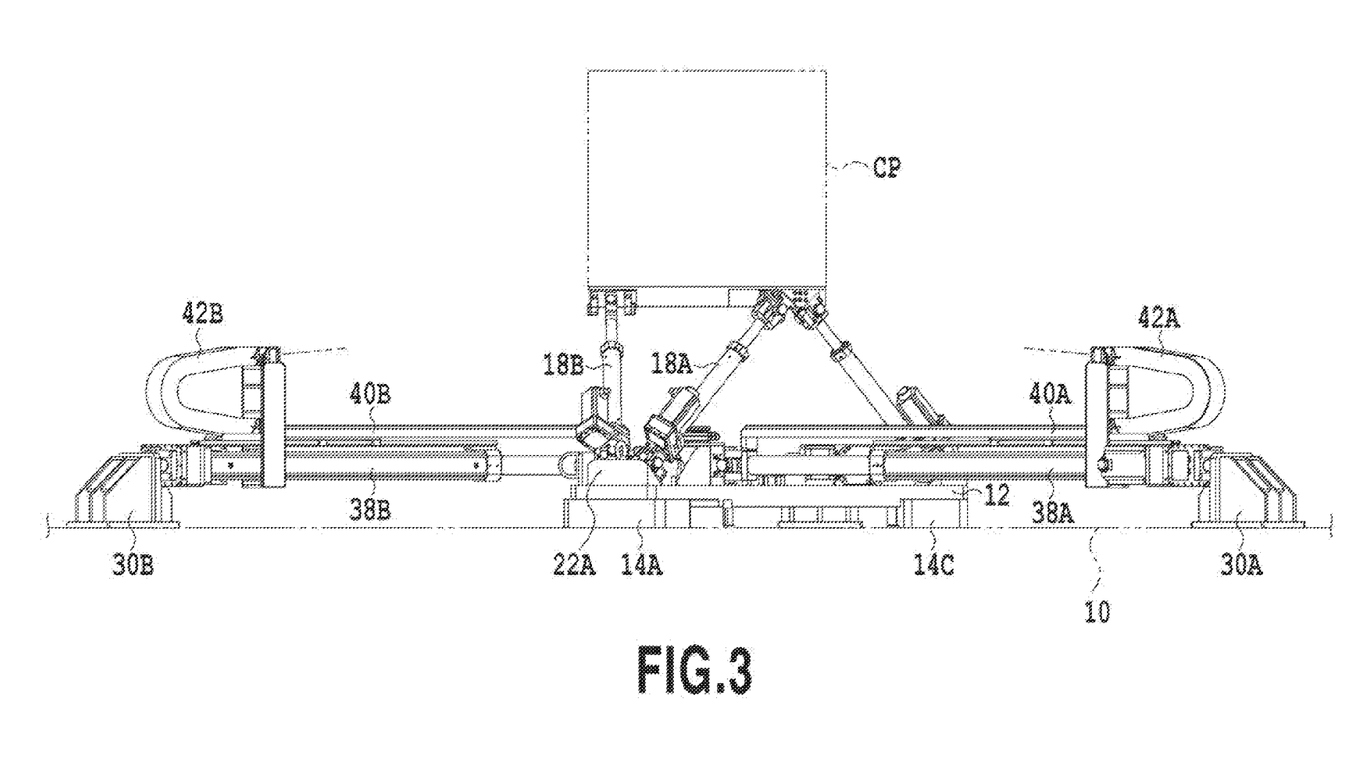
FIG. 3 is a perspective view schematically illustrating the configuration of an example of the vibration system for a simulator including the vibration device according to the present invention.
Figure 4:
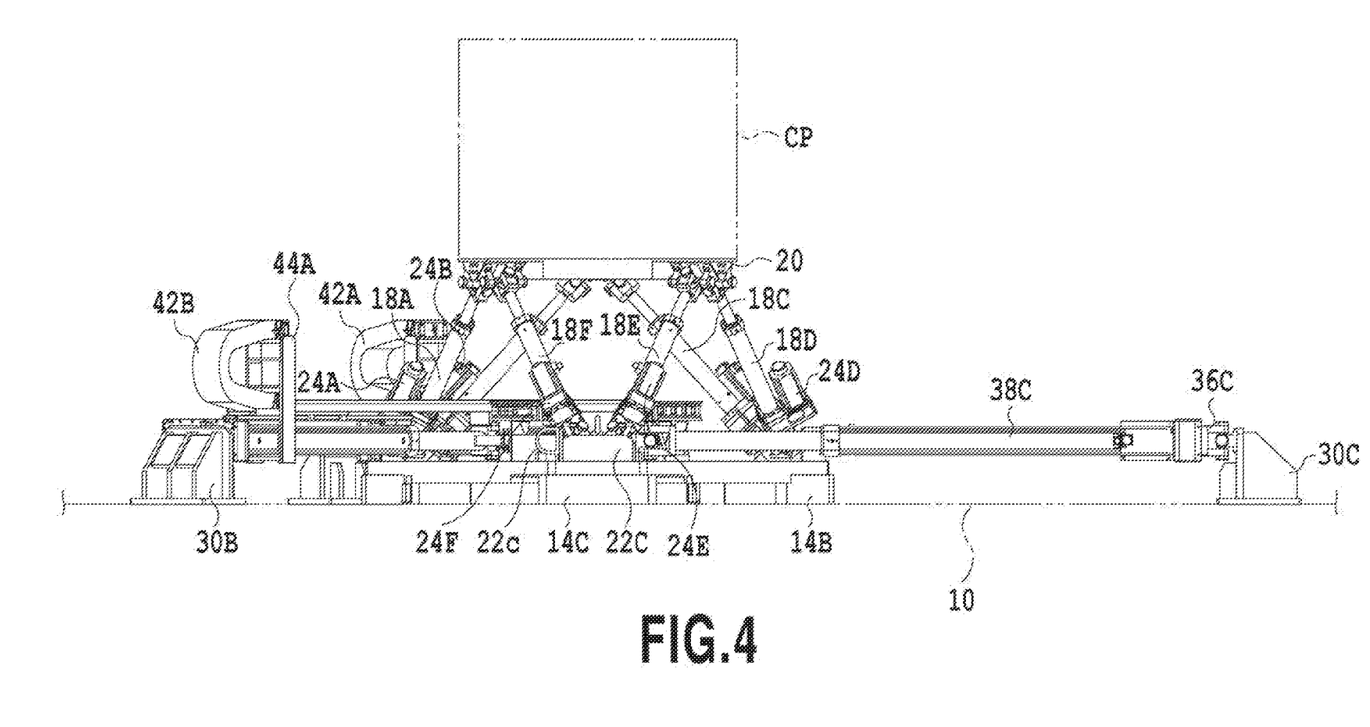
FIG. 4 is a perspective view schematically illustrating the configuration of an example of the vibration system for a simulator including the vibration device according to the present invention.

As illustrated in FIGS. 2 and 3, hydrostatic bearings 14A, 14B, and 14C are provided at three places on the lower surface of the swinging base 12 which faces the surface of the surface plate 10. The hydrostatic bearings 14A, 14B, and 14C are in contact with the surface of the surface plate 10 while operating air is not supplied to a pneumatic tank described later and is separated from the surface of the surface plate 10 by a predetermined clearance while operating air is supplied to the tank. An excessive floating of the hydrostatic bearings 14A, 14B, and 14C on the swinging base 12 from the surface of the surface plate 10 in the direction orthogonal to the aforementioned arrows X and Y by a predetermined distance or more is detected by an abnormality sensor SE1 which is provided at the side surface of the swinging base 12. On the upper surface of the swinging base 12, actuator supporting beds 22A, 22B, and 22C are provided so as to face the aforementioned hydrostatic bearings 14A, 14B, and 14C, respectively. The actuator supporting bed 22A is connected to an end of each of actuators 18A and 18B, which constitute the later-described hexapod, through universal joints as illustrated in FIG. 3. The actuator supporting bed 22B is connected to an end of each of actuators 18C and 18D, which constitute the later-described hexapod, through universal joints as illustrated in FIG. 2. The actuator supporting bed 22C is connected to an end of each of actuators 18E and 18F, which constitute the later-described hexapod, through universal joints as illustrated in FIG. 4. On one side of each actuator supporting bed 22A, 22B, and 22C, stoppers 22a, 22b, and 22c, which are made of rubber, are provided, respectively. The stoppers 22a, 22b, and 22c are configured to come into contact with the vibration devices in the event that the swinging base 12 approaches and reaches beyond a predetermined distance from the respective vibration devices.

The hexapod having six degrees of freedom comprises the followings as major components: the actuators 18A, 18B, 18C, 18D, 18E, and 18F each of which has a piston provided with a universal joint; servomotors 24A, 24B, 24C, 24D, 24E, and 24F which respectively drive the actuators 18A to 18F; and speed reduction mechanisms configured to decrease and transmit the outputs from the servomotors 24A to 24F to the actuators 18A to 18F, respectively. The actuators 18A to 18F have an identical structure each other and each actuator 18A to 18F comprises a ball screw (piston) and a ball nut as shown in Patent Document 3, for example. The servomotors 24A to 24F, each of which has a rotary encoder, are driven and controlled by the host computer according to a predetermined simulation program based on the outputs detected by not-illustrated respective position sensors. The respective position sensors are configured to detect the positions of the pistons of the actuators 18A to 18F.

The three vibration devices respectively has actuator supporting beds 30A, 30B, and 30C. The actuator supporting beds 30A, 30B, and 30C are located on the floor so that universal joints 36A, to 36C are located on a common circumference CC (see FIG. 5) at intervals of a predetermined angle, for example, 120 degrees. The actuator supporting beds 30A, 30B, and 30C support later-described actuators 38A, 38B, and 38C and the like through supporting plates 34A, to 34C and the universal joints 36A to 36C, respectively. Since the actuator supporting beds 30A to 30C have an identical structure each other and the supporting plates 34A to 34C have an identical structure one another, a description is given of the actuator supporting bed 30A and supporting plate 34A while the other actuator supporting beds and supporting stages are not described.

One end face of the supporting plate 34A is swingably supported on the actuator supporting bed 30A through the universal joint 36A as illustrated in FIG. 2. Another end face of the supporting plate 34A is provided with the actuator 38A and the servomotor 32A, which has a rotary encoder. The output shaft of the servomotor 32A is connected to the ball nut (not illustrated) of the actuator 38A through the speed reduction mechanism. Hereby, the movement of the actuator 38A is controlled by driving and controlling the servomotor 32A through the host computer. The actuator 38A comprises a ball screw (a piston) and a ball nut as shown in Patent Document 3, for example. The top end of a piston 38P of the actuator 38A is connected to a later-described alignment mechanism supporting block 52 through a universal joint 43A (see FIG. 9). The universal joint 43A, which is connected to the alignment mechanism supporting block of the three actuators 38A to 38C, is positioned so that the center of rotation axis thereof is located on a common circumference. Each alignment mechanism supporting block 52 is fixed to both of a triangle plate 26 on the upper surface of the swinging base 12 and the swinging base 12 with bolts (not illustrated). The triangle plate 26 is fixed to the swinging base 12 with bolts (not illustrated) so that the center thereof is coincident with the center of rotation of the swinging base 12. Additionally, the respective alignment mechanism supporting blocks 52 are fixed to them at a predetermined equal distances from the center of rotation of the swinging base 12 and the triangle plate 26. The predetermined distances are determined based on the swinging angle, swinging angular speed, angular acceleration, and a movable range of the swinging base 12, as well as the capabilities of manufacturable actuators.

Figure 12A:
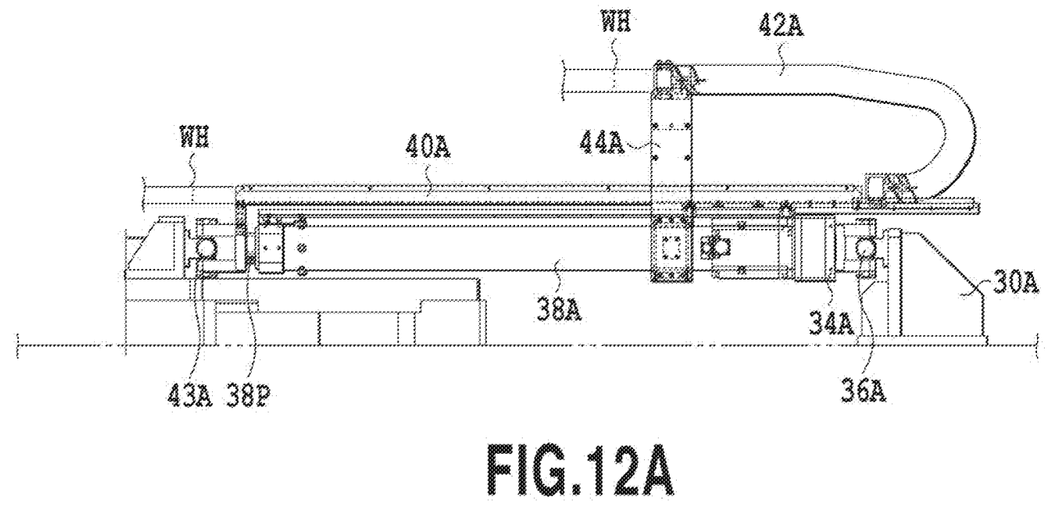
FIG. 12A is a view made available for explaining the operation of a slide duct device.
Figure 12B:
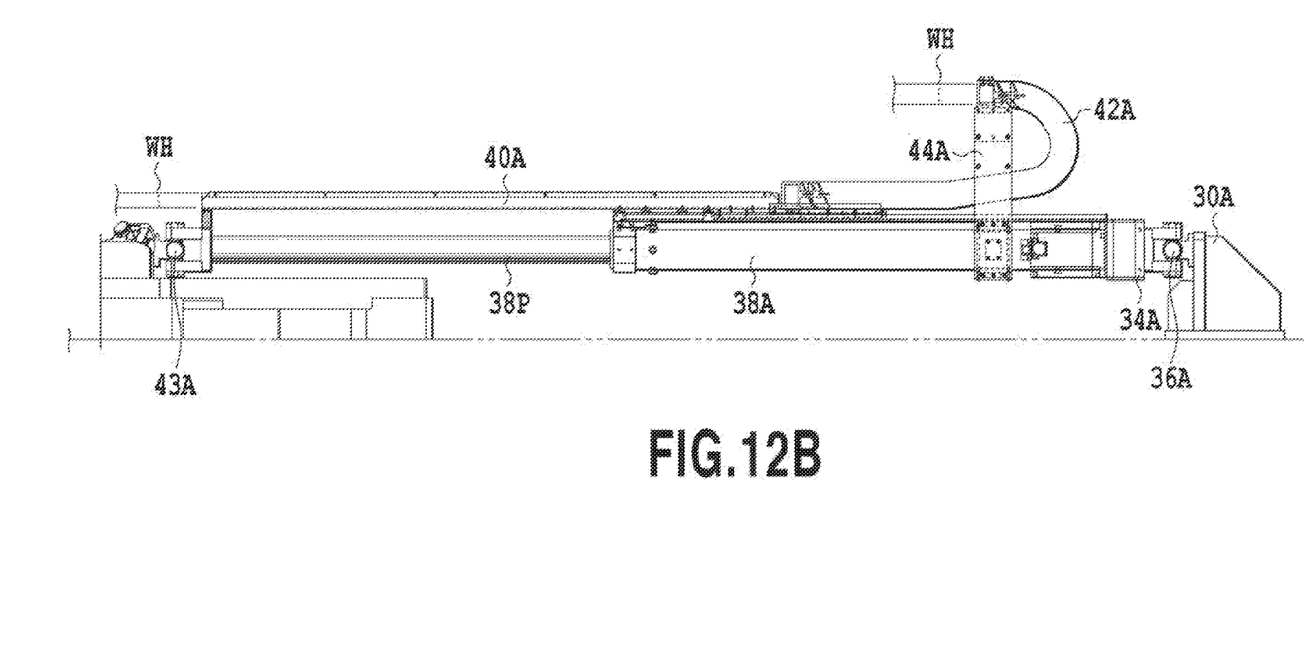
FIG. 12B is a view made available for explaining the operation of a slide duct device.

Herewith the swinging base 12 is reciprocated and swung in accordance with extension and retraction of the piston 38P of the actuator 38A (see FIGS. 12A and 12B).

At two places of the triangle plate 26, holes HA are formed (see FIG. 2) and air hoses to supply operating air to the above-described hydrostatic bearings 14A to 14C are inserted into holes HA.

The slide duct devices are attached to the respective actuators 38A and 38B as illustrated in FIGS. 2 and 12A. Since the slide duct devices have an identical structure, a description is given of the slide duct device attached to the actuator 38A while an explanation of the other device is not omitted. The slide duct devices are configured to guide and protect wire harnesses electrically connecting the not-illustrated host computer and the vibration system for a simulator, the air hoses to supply operating air from pneumatic sources (pneumatic tanks) to hydrostatic bearings, and the like.

Figure 7:
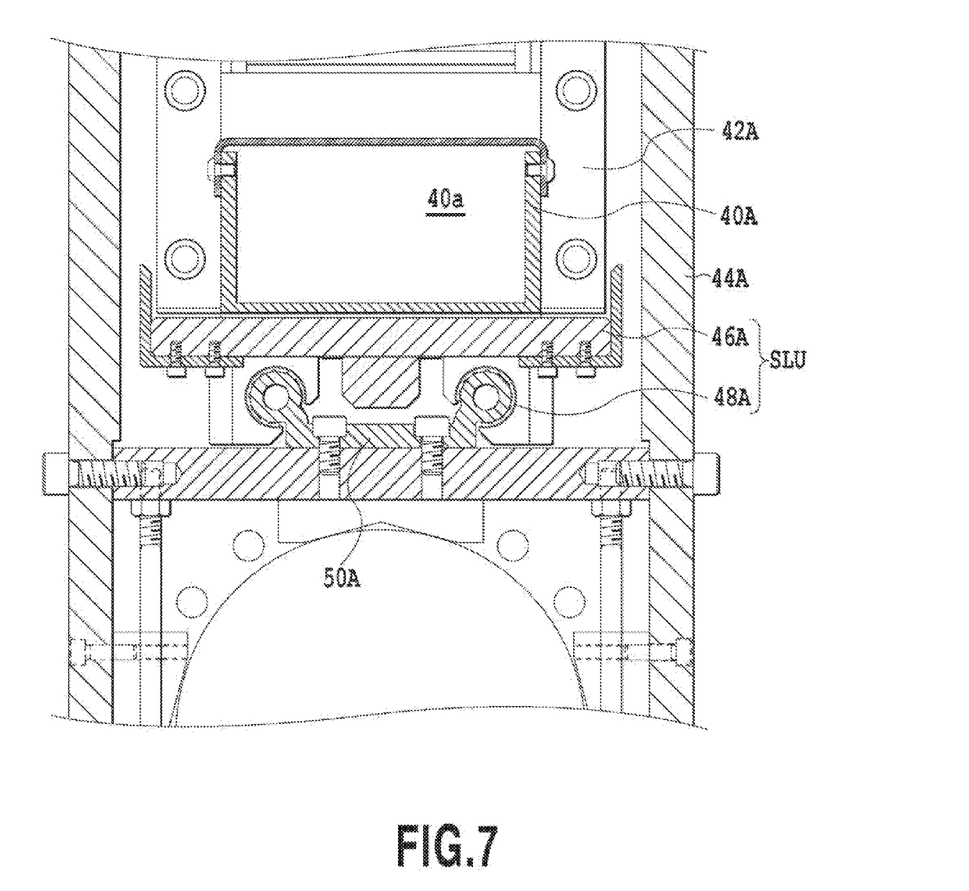
FIG. 7 is a partial cross-sectional view illustrating the configuration of the slide rail unit illustrated in FIG. 6.

The slide duct device comprises the followings as major components: a cableveyor (registered trademark) 42A as a routing material introducing member; a guide duct 40A; and a slide rail unit SLU slidably supporting the guide duct 40A (see FIG. 7). The cableveyor (registered trademark) 42A and the guide duct 40A protect and guide a wire/ductwork material group WH including a wire harness from the not-illustrated host computer and one or a plurality of air hoses from the air tank.

Figure 6:
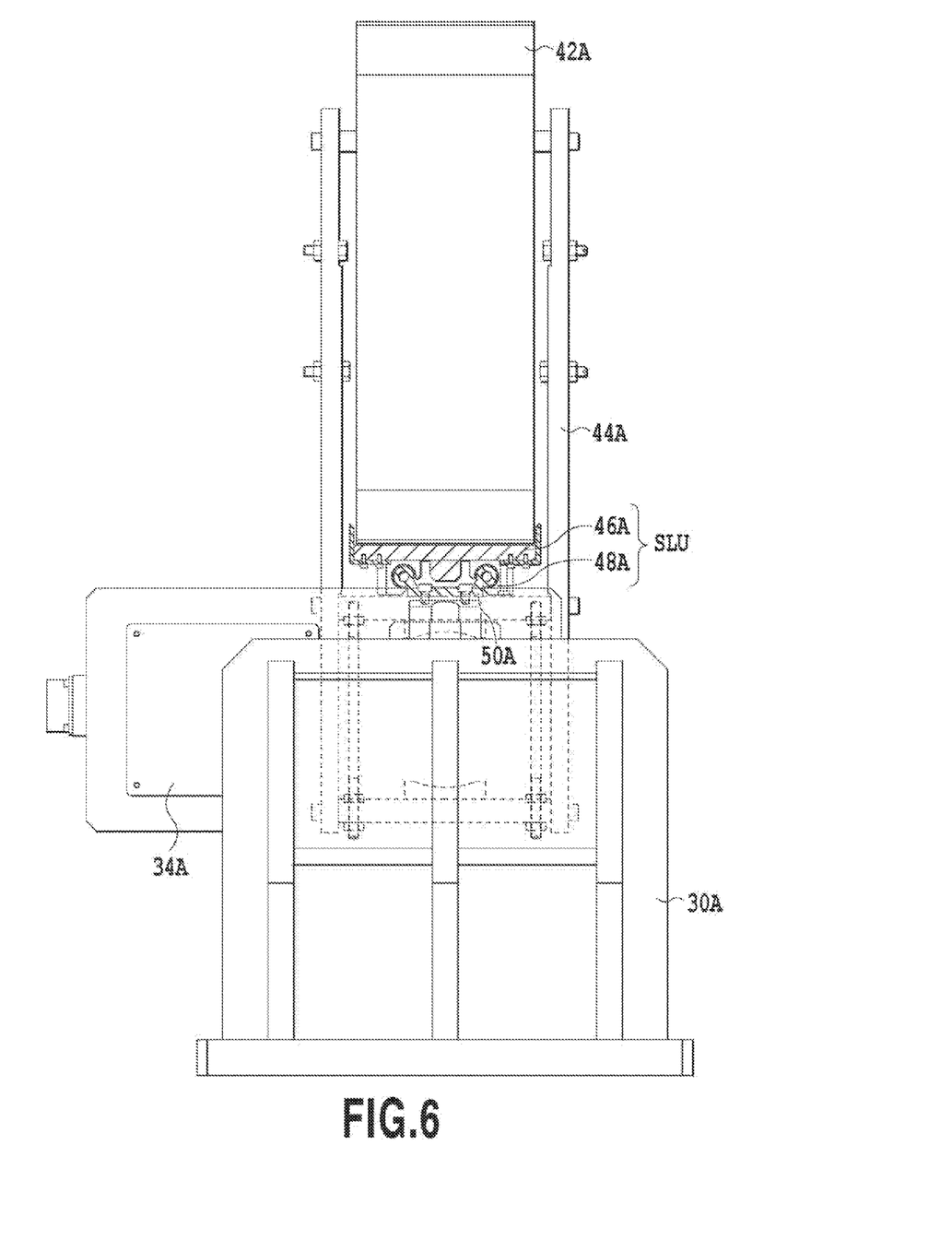
FIG. 6 is a partially cross-sectional configuration view illustrating a cableveyor (registered trademark) and a slide rail unit used in the example illustrated in FIG. 2.

The cableveyor (registered trademark) 42A comprises an inner frame through which the wire/ductwork material group WH is inserted as illustrated in Patent Document 4, for example. The wire/ductwork material group WH is fixed to the inner frame with predetermined clamping devices. The peripheral edge of the open end of the cableveyor (registered trademark) 42A, through which the wire/ductwork material group WH is inserted, is supported by a cableveyor (registered trademark) fixing device 44A. The cableveyor (registered trademark) fixing device 44A having a pair of leg portions is held by the actuator 38A in such a manner that the pair of leg portions sandwich side surfaces of the actuator 38A opposite to each other as illustrated in FIG. 6. Hereby the end of the cableveyor (registered trademark) 42A which is connected to an open end of the guide duct 40A therefore passes between the pair of leg portions.

Figure 9:
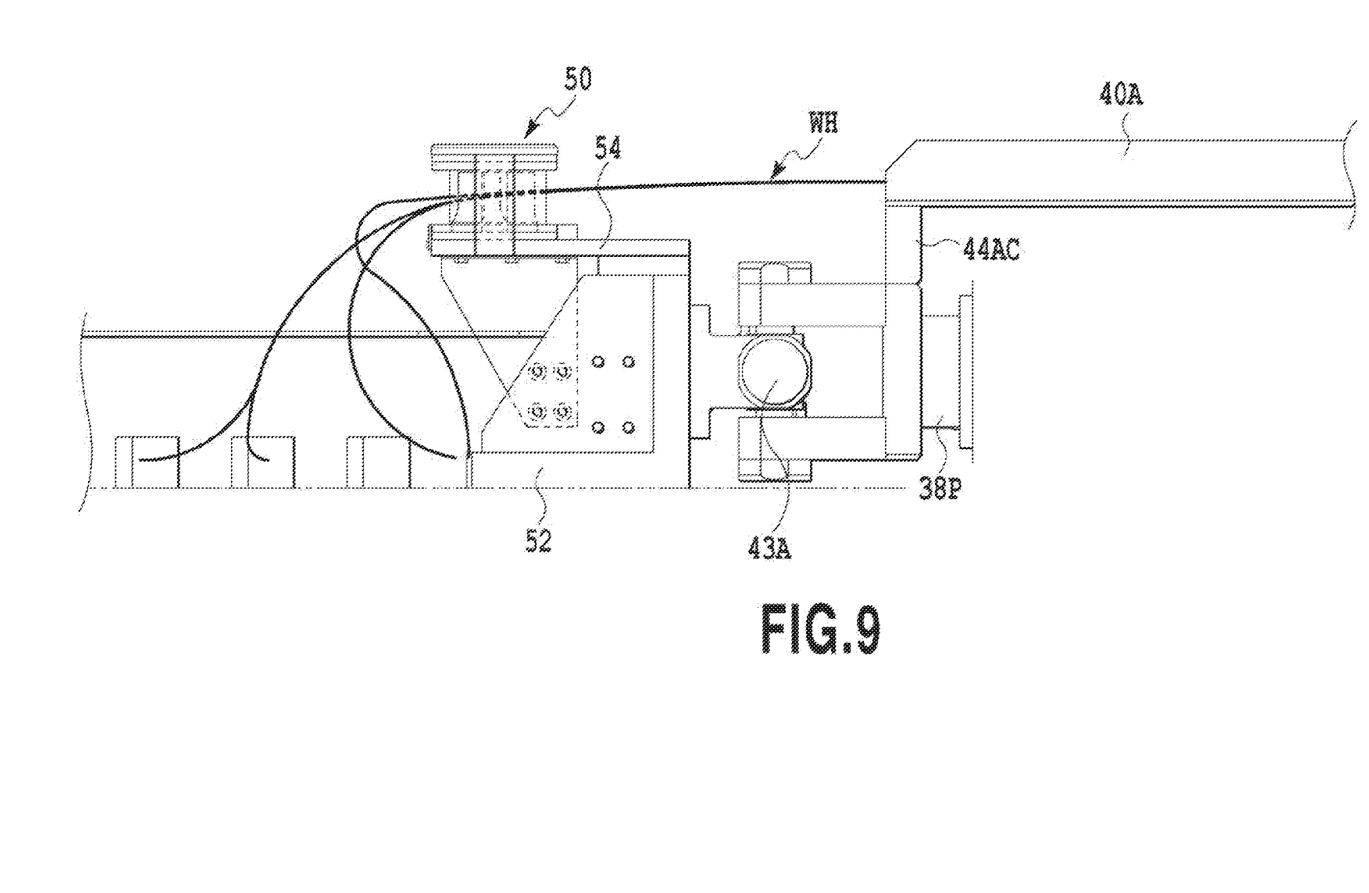
FIG. 9 is a front view of the example illustrated in FIG. 8.

The tubular guide duct 40A is movably supported by the later-described slide rail unit SLU which is supported by the actuator 38A. The guide duct 40A extends along the central axis of the piston 38P of the actuator 38A. A connected end 44AC provided at the peripheral edge of one open end of the guide duct 40A is connected to the universal joint 43A as illustrated in FIG. 9, which is connected to the top end of the piston 38P. The peripheral edge of another open end of the guide duct 40A is connected to the end of the cableveyor (registered trademark) 42A. The guide duct 40A has a guide passage 40a, through which the wire/ductwork material group WH is inserted, as illustrated in FIG. 7.

The slide rail unit SLU is located so as to pass between the pair of leg portions of the cableveyor (registered trademark) fixing device 44A as illustrated in FIGS. 6 and 7. The slide rail unit SLU is fixed to a supporting plate provided between the pair of leg portions of the cableveyor (registered trademark) fixing device 44A and to an end of the body of the actuator 38A. The slide rail unit SLU comprises: a rail 50A, which is fixed to the supporting plate and holds a bearing section; a slider 48A, which slides on the bearing section; and a moving plate 46A, which is connected to the slider 48A and supports the guide duct 40A.

In the aforementioned configuration, when the top end of the piston 38P of the actuator 38A which is operating situates at a first position where the top end extends to press the swinging base 12, as illustrated in FIG. 12B, the connected end 44AC of the guide duct 40A is away from the body of the actuator 38A together with the wire/ductwork material group WH. At that time, the guide duct 40A slides on the rail 50A together with the moving plate 46A and slider 48A of the aforementioned slide rail unit SLU. The part of the cableveyor (registered trademark) 42A which is connected to the end of the guide duct 40A follows the guide duct 40A, so that the cableveyor (registered trademark) 42A bends flexibly. Moreover, since the wire/ductwork material group WH is fixed to the cableveyor (registered trademark) 42A, the wire/ductwork material group WH cannot rub against the inner circumference of the guide passage 40a of the guide duct 40A.

On the other hand, when the top end of the piston 38P of the actuator 38A situates at a second position where the top end retracts to draw the swinging base 12, as illustrated in FIG. 12A, the connected end 44AC of the guide duct 40A comes close to the body of the actuator 38A together with the wire/ductwork material group WH.

Figure 10:
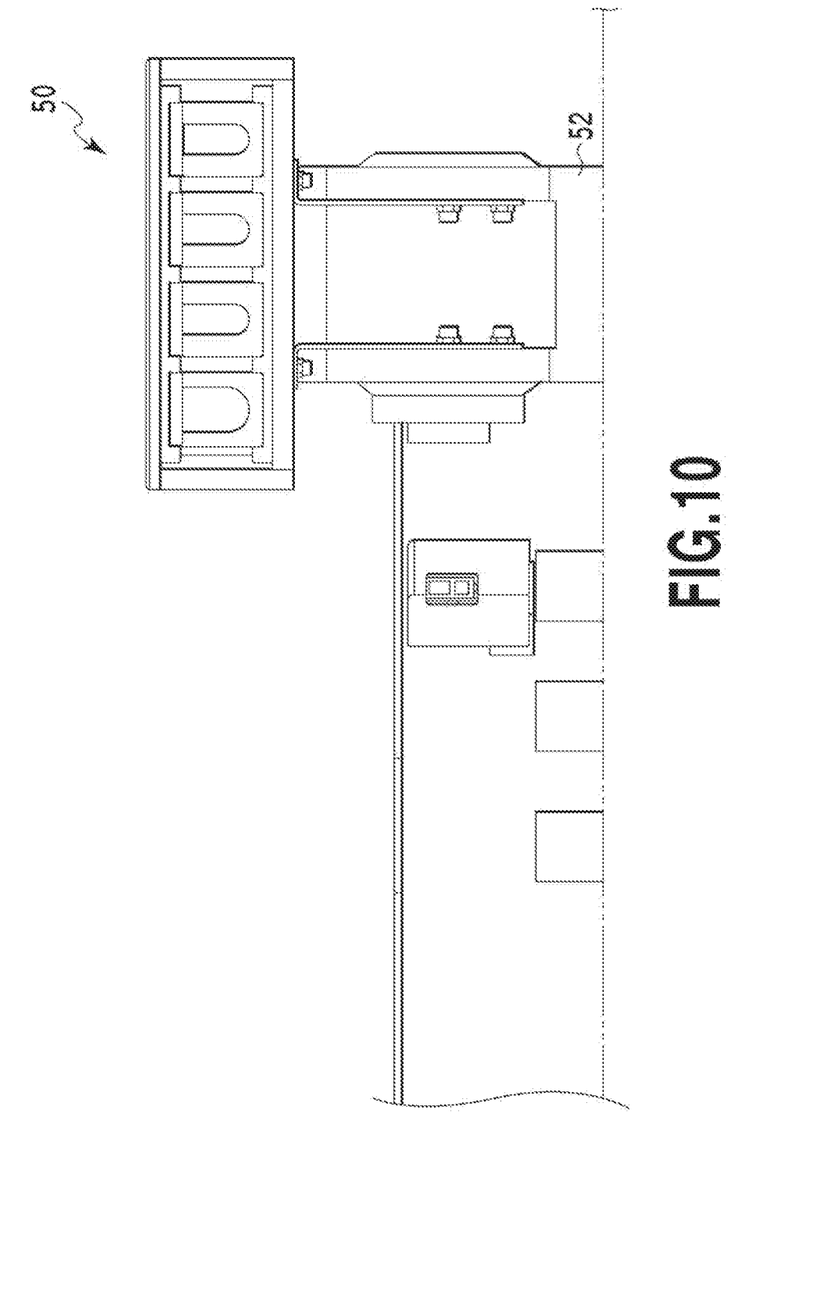
FIG. 10 is a side view of the example illustrated in FIG. 8.

A wire/ductwork material alignment mechanism 50 is provided on the upper end of each alignment mechanism supporting block 52 as a connected fixed end as illustrated in FIGS. 9 and 10 so as to correspond to each slide duct device. The wire/ductwork material alignment mechanism 50 is configured to align the wire/ductwork material group WH that passes through the aforementioned guide duct 40A without damaging as illustrated in FIG. 1.

Figure 1:
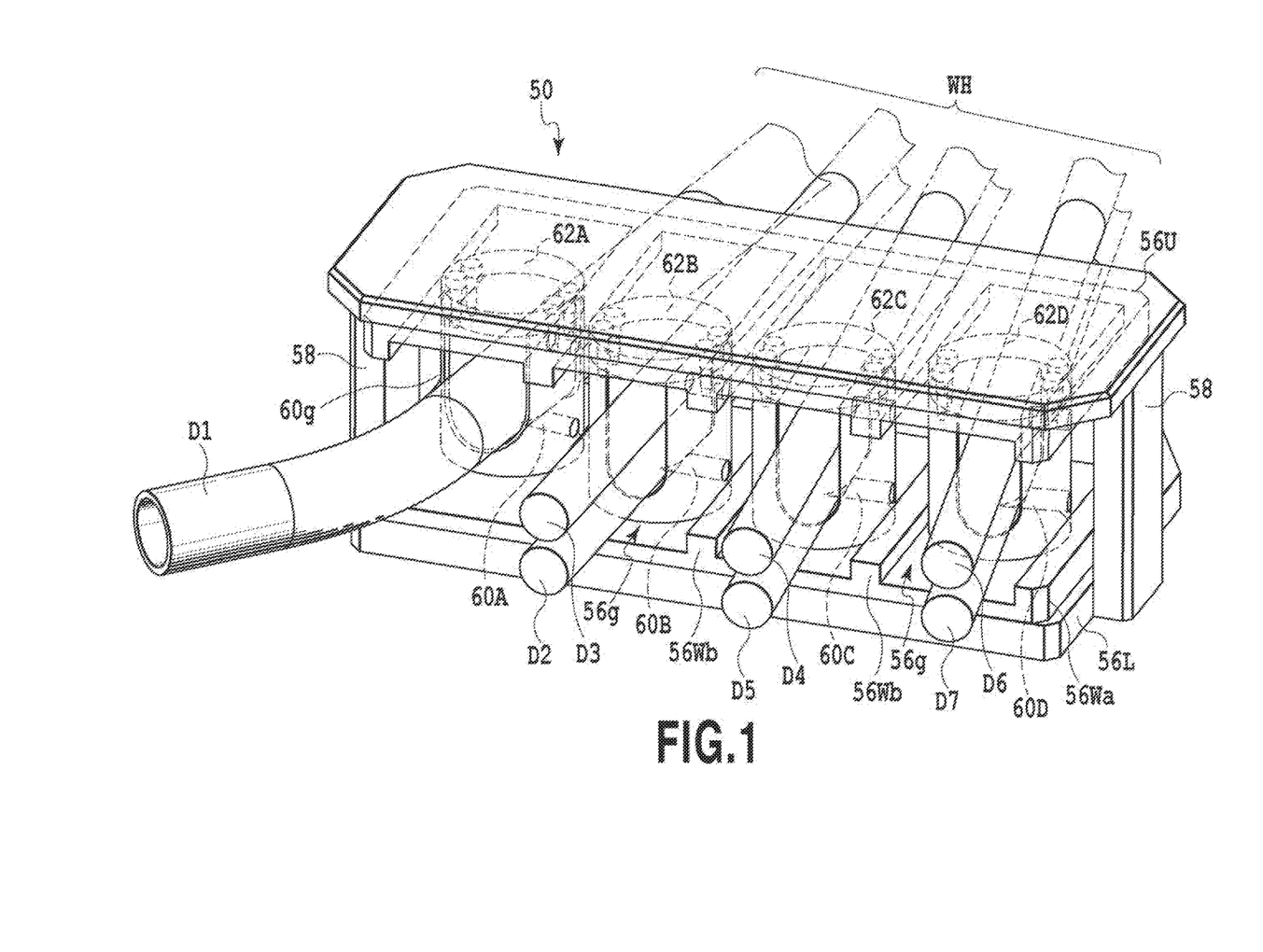
FIG. 1 is a perspective view showing an appearance of a wire/ductwork material alignment mechanism used in an example of a vibration system for a simulator including a vibration device according to the present invention, together with a wire/ductwork material group.

The wire/ductwork material group WH typically illustrated in FIG. 1 comprises: electric wires D2, D3, D4, D5, D6, and D7 constituting a wire harness; and an air hose D1 supplying operating air, for example. The electric wires D2, D3, D4, D5, D6, and D7 are configured to electrically connect the host computer to the aforementioned respective proximity sensors, rotary encoders, servomotors, and other devices.

The wire/ductwork material alignment mechanism 50 comprises: a lower guide plate 56L, which is fixed to a supporting plate 54 fixed to the upper end of the corresponding alignment mechanism supporting block 52; an upper guide plate 56U, which faces the lower guide plate 56L at a predetermined distance therefrom; and four supporting rods 60A, 60B, 60C, and 60D.

The lower and upper guide plates 56L and 56U are connected to each other with a pair of stays 58 so as to be parallel to each other with a predetermined space therebetween. Since the lower and upper guide plates 56L and 56U have an identical structure each other, a description is given of the lower guide plate 56L while an explanation of the upper guide plate 56U is omitted.

The lower guide plate 56L is made of a resin material, for example, and has guide grooves 56g at four places. Each of guide groove 56g is arranged in parallel to each other and extend in the axial directions of the electric wires and air hoses constituting the wire/ductwork material group WH. Neighboring the guide grooves 56g is separated with a partition wall 56Wb. A sidewall 56Wa facing the partition wall 56Wb is formed beside the guide groove 56g at the right end.

The support rods 60A, 60B, 60C, and 60D as alignment members are slidably and rotatably provided within the respective guide grooves 56g. Since the support rods 60A to 60D have an identical structure each other, a description is given of the support rod 60A while an explanation of the other support rods are omitted.

Figure 8:
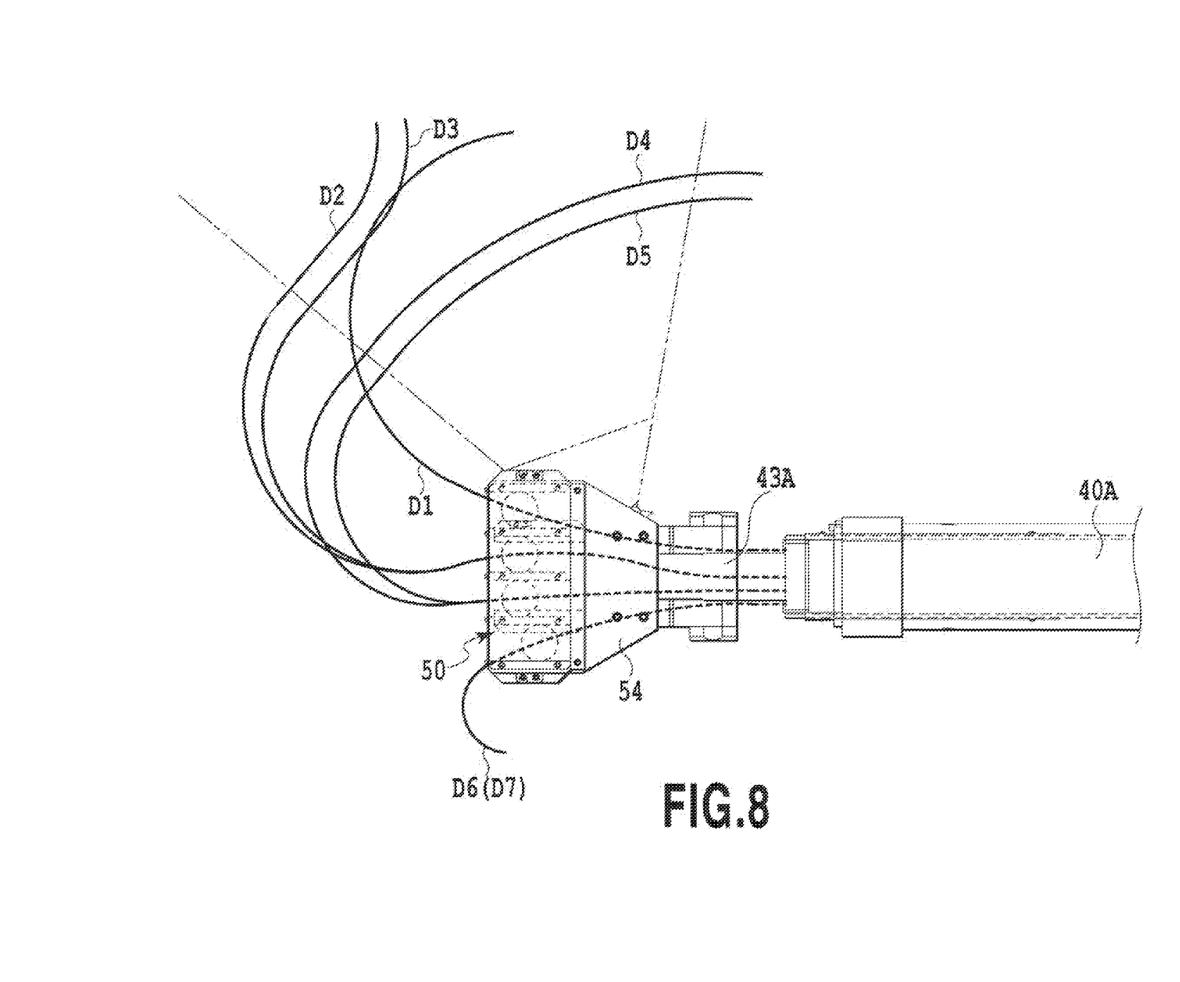
FIG. 8 is a plan view illustrating the wire/ductwork material alignment mechanism illustrated in FIG. 1, together with the wire/ductwork material group through a guide duct.

For example, the support rod 60A is cylindrical and is made of aluminum alloy, having a groove 60g having a U-shaped cross section. The groove 60g penetrates along the radial direction of the support rod 60A. The groove 60g has a width set slightly larger than the diameter of the air hose D1, for example. On the upper end face of the support rod 60A, a stopper plate 62A, which is configured to press the air hose D1 and hold the same within the groove 60g, is fixed with machine screws. Similar stopper plates 62B, 62C, and 62D are fixed with machine screws on the upper end faces of the other support rods. Herewith, as illustrated in FIG. 8, the electric wires D2, D3, D4, D5, D6, and D7 constituting the wire harness and the air hose D1 for supplying operating air in the wire/ductwork material group WH passing through the guide duct 40A are respectively passed through the grooves 60g of the support rods 60B, 60C, 60D, and 60A in the wire/ductwork material alignment mechanism 50 and are then connected to the proximity sensors, rotary encoders, servomotors, or hydrostatic bearings.

Figure 11:
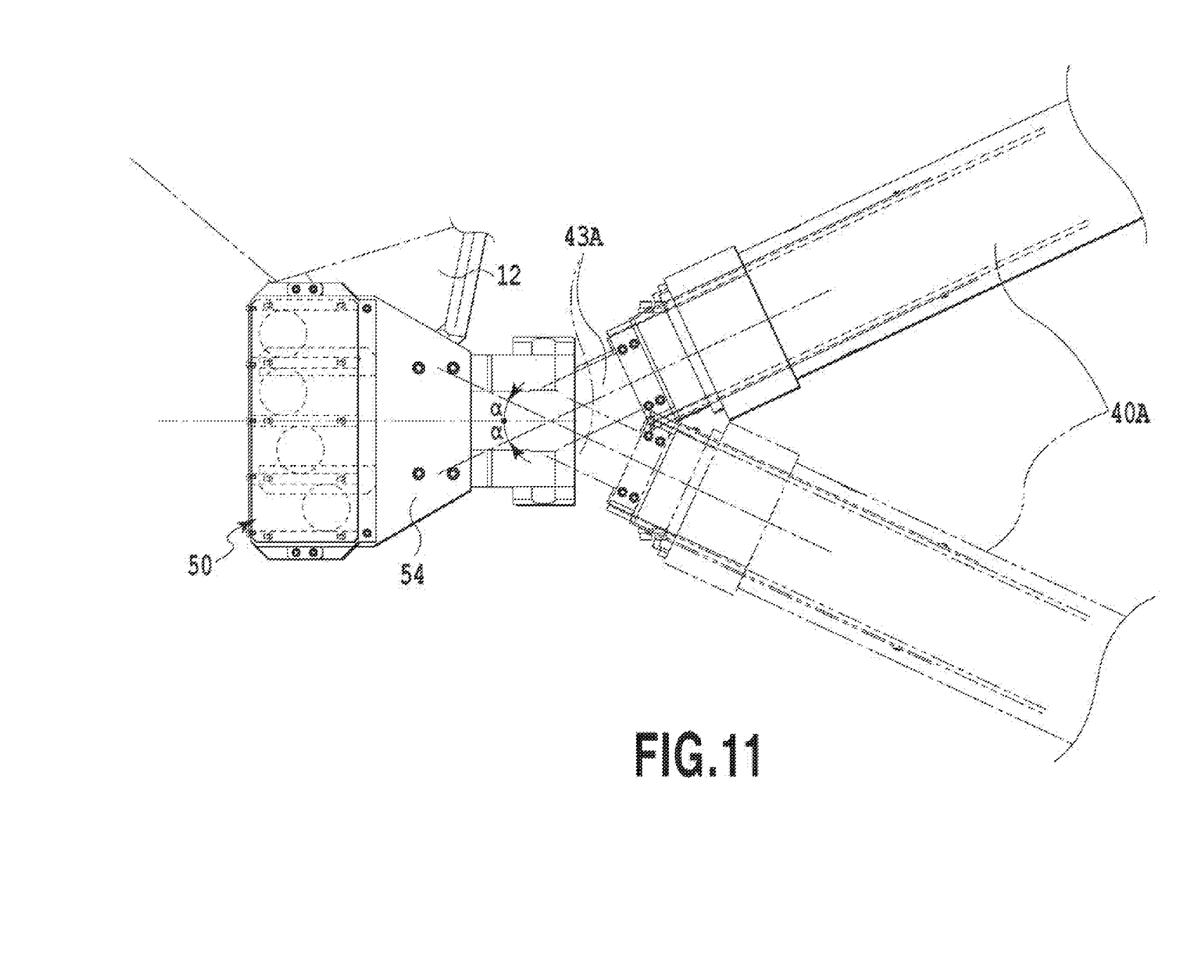
FIG. 11 is an explanatory view made available for explaining the operation of the wire/ductwork material alignment mechanism.

In the aforementioned configuration, when the vibration system for a simulator is in operation, as illustrated in FIG. 11, relative movement of the slide duct devices to the swinging base 12 or relative movement of the swinging base 12 to the slide duct devices is generated, and thus it could cause bending, compression, or tensile force to act on the wire/ductwork material group WH. That is to say, because the connected end 44AC of the guide duct 40A is connected to the alignment mechanism supporting block 52 through the universal joint 43A connected to the top end of the piston 38P as illustrated in FIG. 9, the guide duct 40A is swingable relative to the alignment mechanism supporting block 52 so that the central axis thereof intersects with the central axis of the supporting plate 54 to move rotationally by a predetermined angle α clockwise or counterclockwise as illustrated in FIG. 11. Hereby, when the central axis of the guide duct 40A intersects with the central axis of the supporting plate 54 at the predetermined angle α, the electric wires D2 to D7 and air hose D1 are subjected to bending stress.

In such a case, the generated force causes the support rods 60B, 60C, 60D, and 60A holding the electric wires D2 to D7 and air hose D1 to be slid and rotated within the respective grooves 56g. Accordingly, the wires D2 to D7 and air hose D1 themselves are not subjected to force. Moreover, movement of the wires D2 to D7 and air hose D1 themselves is restricted, and also the wires D2 to D7 are prevented from rubbing.

It should be noted that though the aforementioned example of the vibration system for a simulator including the vibration device according to the present invention is applied to the driving simulator, the vibration system for a simulator is not so limited but is applicable to other simulators such as flight simulators. Moreover, in the aforementioned example, the slide duct devices are provided at two places. However, the slide duct devices are not limited to the example, and the number of places where the slide duct devices are provided may be one or three. Furthermore, in the aforementioned example, though the wire/ductwork material alignment mechanism has the four supporting rods, wire/ductwork material alignment mechanism is not so limited but may include one to three supporting rods or five or more supporting rods depending on the number of wire harnesses.

The invention claimed is:

1. A vibration device, comprising:
an actuator having a piston which has a connected fixed end at one end thereof connected to a swinging base configured to reciprocate and swing, and which is moved between a first position and a second position;
driving and controlling means for driving and controlling the actuator;
a guide duct which has a passage communicating with one open end thereof, through which a wire or ductwork material is inserted, and is supported by the actuator so as to be movable in accordance with the movement of the piston; and
an alignment mechanism which is provided at the connected fixed end at the one end of the piston and is configured to align the wire or duct material extended from another open end of the passage of the guide duct through a slidable and rotatable alignment member.

2. A vibration system for a simulator including a vibration device, comprising:
a plurality of actuators respectively having pistons which have connected fixed ends at one ends thereof connected to a plurality of different places in a swinging base configured to reciprocate and swing, and each of which is moved between a first position and a second position,
driving and controlling means for driving and controlling the actuators;
a guide duct that has a passage communicating with one open end thereof, through which a wire or duct material is inserted, and is supported by at least one of the plurality of actuators so as to be movable in accordance with the movement of the piston,
an alignment mechanism which is provided at the connected fixed ends of the one ends of the pistons and is configured to align the wire or duct material extended from another open end of the passage of the guide duct through a plurality of slidable and rotatable alignment members, and a hexapod which is provided between a cockpit supporting bed and the swinging base and has a mechanism with six degrees of freedom.

3. The vibration system for a simulator including the vibration device according to claim 2, wherein the swinging base has a mechanism with three degrees of freedom on a common plane where the plurality of actuators are provided.

4. The vibration system for a simulator including the vibration device according to claim 3, wherein each of the alignment members of the alignment mechanism has a groove through which the wire or duct material passes, and is configured to hold the wire or duct material.

5. The vibration system for a simulator including the vibration device according to claim 2, wherein the guide duct is connected to the connected fixed end through a joint so that an angle of the axis of the guide duct with respect to the connected fixed end at the one end of the piston connected to the swinging base is variable.

* * * * *